June 5, 1945.  C. H. JUDD  2,377,694

FASTENING DEVICE

Filed July 7, 1944

INVENTOR.
CHARLES H. JUDD
BY
Bates, Teare & McDean
ATTORNEYS

Patented June 5, 1945

2,377,694

UNITED STATES PATENT OFFICE 2,377,694

FASTENING DEVICE

Charles H. Judd, Cleveland, Ohio, assignor to Tinnerman Products, Inc., Cleveland, Ohio, a corporation of Ohio Application July 7, 1944, Serial No. 543,871

5 Claims. (Cl. 85—36)

This invention relates to sheet metal fasteners that are adapted to be formed for engagement with the shank of a bolt or the like and that are used for holding a plurality of parts together.

Heretofore an effort has been made to construct a sheet metal fastener that has a thread-engaging portion thereon formed by bending the ends of a sheet metal body upwardly and inwardly toward each other, but it has been found that such arrangement results in a fastener wherein the tongues are unsupported, except adjacent their junction with the body, against lateral movement with reference to the body upon the tightening of the bolt that is passed therethrough. Any sidewise movement of either tongue with reference to the body reduces the holding power of the fastener and renders it insecure as a medium for holding a plurality of parts together.

An object of the present invention, therefore, is the construction of a fastening device which utilizes the advantage of folded-over extensions that cooperate to provide a shank-engaging portion of a bolt or the like member that is passed therethrough, and yet is so constructed as to resist any tendency of the tongues to move sidewise to an objectionable degree with respect to the body during the tightening operation.

Figure 1:
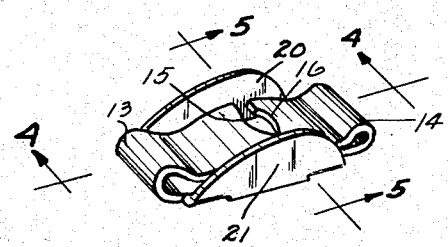
Figure 2:
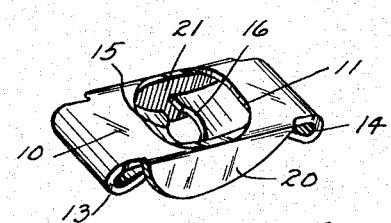
Figure 4:
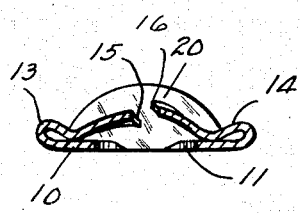
Figure 5:
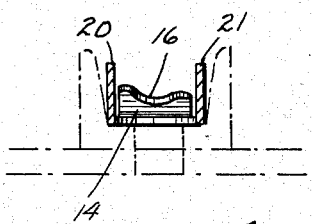
Figure 3:
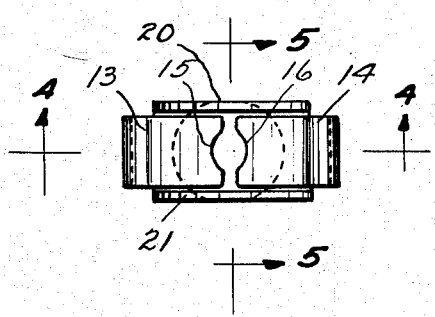
Figure 6:
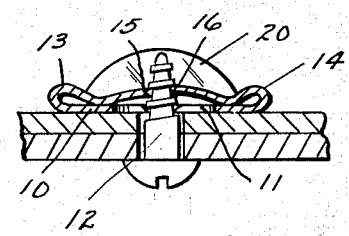

In the drawing, Fig. 1 is a top perspective view of the fastener made in accordance with the present invention; Fig. 2 is a bottom perspective view of the fastener; Fig. 3 is a top plan view of the fastener; Figs. 4 and 5 are sections taken on planes indicated by the correspondingly numbered lines in Figs. 1 and 3, and Fig. 6 is a longitudinal vertical section through the fastener showing it in assembled position.

A fastener made according to the present invention has a base or body portion 10 which is provided with an aperture 11 for receiving the shank of a screw or similar member 12. The body also has the end portions 13 and 14 thereof bent upwardly and in a generally inward direction to provide tongues or arms, each of which has the end thereof notched, as at 15 and 16, respectively, to receive the shank of the member that is passed therethrough. Preferably, the end of each arm adjacent the notch portion is shaped to conform to the helix of the threaded member with which it is intended to be used.

While I have stated that the arms extend generally inwardly, nevertheless I prefer to provide a loop adjacent the junction of each arm with the body and then to extend the arms upwardly and inwardly toward the center of the fastener so that each arm has a generally convex surface on the upper portion thereof from the base of the loop to the free end of the arm. Such construction greatly increases the ability of the arms to withstand forces that tend to distort them during the tightening operation.

As an additional means for limiting sidewise movement of the arms with respect to the base during the tightening operation, I provide truss-like portions or wings 20 and 21 which bridge the gap across the aperture 11 and which are disposed in planes substantially normal to the base and in close proximity to the side edges of the arms 13 and 14. Thus, the base in effect comprises two end portions which are inner-connected by the wing portions 20 and 21, between which the thread-engaging arms extend.

An advantage of the present invention is the fact that the thread-engaging portions may comprise spring-like arms having relatively long leverage, thereby providing a good range of movement and assuring a tight gripping connection between the ends of the arms and the shank that is passed therebetween, and at the same time overcoming the difficulty of sidewise movement of the arms with respect to the base during the tightening operation. The invention has achieved the foregoing advantages in a manner that enables the fastener to be economically manufactured.

I claim:

1. A fastening device comprising a strip of sheet metal having a base portion and having extensions at each end thereof, the extensions being bent upwardly and inwardly and providing arms the ends of which cooperate to engage the shank of a bolt or the like, and means formed integrally with the base and extending in planes normal thereto and along the side edges thereof, and providing abutments for limiting sidewise movement of each arm with respect to the base.

2. A fastening device having a base comprising a strip of sheet metal having an aperture therein for receiving the shank of a bolt or the like, and having the ends thereof bent backwardly upon itself to provide arms which cooperate to engage the shank of a bolt or the like, said body having portions thereof extending in planes normal to the plane of the base and in close proximity to the side edges of said arms, said portions operating as abutments to limit sidewise movement of the arms with respect to the base.

3. A fastener comprising a strip of sheet metal having a central aperture therein and having the end portions extending upwardly and inwardly to provide arms that are adapted to engage the shank of a bolt or the like which extends through said aperture, each arm having a loop adjacent its juncture with the base, and having the portion between the loop and the free end thereof curved in a longitudinal direction, there being truss-like members extending along the side edges of the base and acting as abutments to limit sidewise movement of the arms with respect to the base.

4. A fastener comprising a strip of sheet metal having the end portions thereof bent upwardly and inwardly toward each other to provide arms each having a notch adjacent the free end thereof, said notches cooperating to provide an aperture for the reception of a bolt or the like which extends through the body, said body having parallel abutments projecting from the base and on the same side thereof as the arms, and extending above the arms and operating as abutments to limit sidewise movement of the arms with respect to the base.

5. A fastening device comprising a strip of sheet metal having a bolt receiving aperture extending from one side edge thereof to the other, and having extensions bent upwardly and inwardly to provide arms which extend on the same side of the body, each arm having a loop adjacent its juncture with the body and having a notch adjacent the free end portion thereof, said notches cooperating to engage the shank of a bolt or the like which extends through said aperture, there being wing portions extending along the side edges of the body and on the same side thereof as the arms, said wing portions bridging the gap formed by said aperture and operating as abutments to limit sidewise movement of each arm with respect to the base.

CHARLES H. JUDD.